(12) United States Patent
Futahashi et al.

(10) Patent No.: US 9,650,910 B2
(45) Date of Patent: May 16, 2017

(54) STEAM VALVE AND STEAM TURBINE

(71) Applicant: MITSUBISHI HITACHI POWER SYSTEMS, LTD., Kanagawa (JP)

(72) Inventors: Kensuke Futahashi, Tokyo (JP); Toshinari Nishimura; Katsuhisa Hamada, Tokyo (JP); Shoichi Okawara, Tokyo (JP); Atsunori Mori, Tokyo (JP); Tomoshige Takata, Tokyo (JP); Keisuke Matsuyama, Tokyo (JP); Takumi Matsumura, Tokyo (JP); Tomoyuki Onishi, Tokyo (JP); Tomoshi Yamasaki, Tokyo (JP); Hiroshi Sato, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/652,293

(22) PCT Filed: Dec. 17, 2013

(86) PCT No.: PCT/JP2013/083736
§ 371 (c)(1),
(2) Date: Jun. 15, 2015

(87) PCT Pub. No.: WO2014/098073
PCT Pub. Date: Jun. 26, 2014

(65) Prior Publication Data
US 2015/0322812 A1 Nov. 12, 2015

(30) Foreign Application Priority Data
Dec. 21, 2012 (JP) .................................. 2012-279131

(51) Int. Cl.
*F01D 17/14* (2006.01)
*F16K 31/44* (2006.01)
(Continued)

(52) U.S. Cl.
CPC ........... *F01D 17/10* (2013.01); *F01D 17/145* (2013.01); *F01D 25/00* (2013.01); *F02C 9/24* (2013.01);
(Continued)

(58) Field of Classification Search
CPC . F16K 31/44; F16K 1/44; F01D 17/10; F01D 17/145; F01D 25/00; F02C 9/24;
(Continued)

(56) References Cited

U.S. PATENT DOCUMENTS 3,529,630 A * 9/1970 Podolsky .................. F16K 1/44
137/630.13
5,971,018 A * 10/1999 Karlsson et al. ..... F01D 17/145
137/613
2012/0137688 A1 6/2012 Batwal et al.

FOREIGN PATENT DOCUMENTS

DE 29 48 639 6/1981
EP 2 270 370 A1 1/2011
(Continued)

OTHER PUBLICATIONS

International Search Report issued Jan. 28, 2014 in corresponding International Application No. PCT/JP2013/083736.
(Continued)

*Primary Examiner* — Kevin Lee
(74) *Attorney, Agent, or Firm* — Wenderoth, Lind & Ponack, L.L.P.

(57) ABSTRACT

Provided is a steam valve (1) equipped with: a stop valve (2) capable of stopping/releasing the flow of steam when driven so as to open/close; an governing valve (3) that is provided coaxially in the interior of the stop valve (2), and that controls the flow volume of the steam when driven to open/close in the same direction as the opening/closing of the stop valve (2); and a first guide part (11) that is provided
(Continued)

between the stop valve (2) and the governing valve (3) so as to separate the stop valve and the governing valve in the radial direction, and that guides at least the governing valve in the opening/closing direction.

6 Claims, 6 Drawing Sheets

(51) Int. Cl.
*F01D 17/10* (2006.01)
*F01D 25/00* (2006.01)
*F16K 1/44* (2006.01)
*F02C 9/24* (2006.01)

(52) U.S. Cl.
CPC ............... *F16K 1/44* (2013.01); *F16K 31/44* (2013.01); *F05D 2220/31* (2013.01); *F05D 2220/72* (2013.01); *Y10T 137/87121* (2015.04); *Y10T 137/87981* (2015.04); *Y10T 137/8803* (2015.04)

(58) Field of Classification Search
CPC ..... Y10T 137/87121; Y10T 137/88022; Y10T 137/8803; Y10T 137/88038
USPC .................... 137/637.2, 637, 614.14–614.18
See application file for complete search history.

(56) References Cited

FOREIGN PATENT DOCUMENTS

| | | |
|---|---|---|
| EP | 2 392 781 | 12/2011 |
| JP | 57-37157 | 3/1982 |
| JP | 60-184907 | 9/1985 |
| JP | 2979645 | 11/1999 |
| JP | 2002-97903 | 4/2002 |
| JP | 2003-27904 | 1/2003 |
| JP | 2003-56306 | 2/2003 |
| JP | 3680012 | 8/2005 |
| JP | 2007-278179 | 10/2007 |
| JP | 4472297 | 6/2010 |
| RU | 2 244 184 | 1/2005 |
| WO | 2007/025945 | 3/2007 |
| WO | 2011/000733 | 1/2011 |

OTHER PUBLICATIONS

Written Opinion of the International Searching Authority issued Jan. 28, 2014 in corresponding International Application No. PCT/JP2013/083736.
Office Action issued Nov. 27, 2015 in corresponding Chinese Patent Application No. 201380061822.4, with English translation.
Extended European Search Report issued Aug. 8, 2016 in corresponding European Application No. 13864265.7.
Office Action issued Apr. 12, 2016 in corresponding Japanese Patent Application No. 2014-553152 (English translation).
Office Action issued Apr. 14, 2016 in corresponding Korean Patent Application No. 10-2015-7013988 (English translation).

* cited by examiner

STEAM VALVE AND STEAM TURBINE

TECHNICAL FIELD

The present invention relates to a steam valve that controls the flow of steam into a steam turbine, and a steam turbine equipped with the steam valve.

Priority is claimed on Japanese Patent Application No. 2012-279131, filed Dec. 21, 2012, the content of which is incorporated herein by reference.

BACKGROUND ART

A number of steam valves are provided in steam turbines of thermoelectric power plants, nuclear power plants, or the like in order to regulate the amount of steam according to changes in loads or to stop the supply of steam in abnormal cases. The steam valves are constituted of a main steam stop valve and a steam governing valve. The main steam stop valve is an ON/OFF valve that stops or releases the flow of steam. The main steam stop valve is a valve that closes, for example, when power generation is stopped and thereby stops steam from flowing into the steam turbine. The steam governing valve is a flow volume control valve that controls the flow volume of steam which flows into the steam turbine.

As steam valves of the related-art, a steam valve in which a main steam stop valve and a steam governing valve are housed in one valve case (valve body) is known, as described in PTL 1. This steam valve has a configuration in which the main steam stop valve and the steam governing valve are driven from the same direction on one axis. Pressure loss in the steam valve is directly connected to steam turbine efficiency, and having the least amount of pressure loss as possible is desired. Hence, this type of steam valve, which can lower the pressure loss without any obstacles, such as a valve shaft (valve rod), in a downstream fluid channel, has been widely used.

CITATION LIST

Patent Literature

[PTL 1] Japanese Unexamined Patent Application Publication NO. 2002-097903

SUMMARY OF INVENTION

Technical Problem

Meanwhile, the above-described steam valve has a configuration in which the steam governing valve is arranged on an outer peripheral surface of the main steam stop valve. That is, since this steam valve has a configuration in which an inner peripheral surface of the steam governing valve that is formed in a cylindrical shape slides on the outer peripheral surface of the main steam stop valve that is similarly formed in a cylindrical shape, there is a problem in that seizure is apt to occur between the main steam stop valve and the steam governing valve.

An object of the invention is to provide a steam valve that can prevent seizure from occurring between a stop valve and a governing valve in the steam valve that drives the stop valve and the governing valve from the same direction on one axis, and a steam turbine equipped with the steam valve.

Solution to Problem

According to one aspect of the invention, a steam valve includes a stop valve capable of stopping/releasing the flow of steam when driven so as to open/close; a governing valve that is provided coaxially in the interior of the stop valve, and that controls the flow volume of the steam when driven to open/close in the same direction as an opening/closing direction of the stop valve; and a first guide part that is provided between the stop valve and the governing valve so as to separate the stop valve and the governing valve in a radial direction, and that guides at least the governing valve in the opening/closing direction.

According to the above configuration, since the first guide part is provided so as to separate the stop valve and the governing valve, the stop valve and the governing valve do not have contact with each other, and thus the seizure occurring between the stop valve and the governing valve can be prevented.

The above steam valve may be configured so as to further include a second guide part that is provided on an outer peripheral side of the stop valve and that guides the stop valve in the opening/closing direction.

According to the above configuration, since the stop valve is guided by the second guide part and the first guide part is configured so as to guide only the governing valve, guiding of the stop valve can be more reliably performed.

The above steam valve may be configured so as to further include a valve body of the stop valve; a valve body of the governing valve; a valve case having a valve seat, against which the valve body of the stop valve and the valve body of the governing valve abut, provided therein; a stop valve shaft that actuates the stop valve; and a governing valve shaft that actuates the governing valve. At least one of the stop valve shaft and the governing valve shaft may have a hollow structure, the other of the stop valve shaft and the governing valve shaft may be inserted into the hollow structure, and the stop valve shaft and the governing valve shaft may protrude to the outside via a through-hole formed in the valve case.

According to the above configuration, since only the through-hole through which one valve shaft is passed is required as an insertion hole for the valve shafts, miniaturization of the steam valve can be achieved.

In the above steam valve, the stop valve shaft may be directly driven by a first drive mechanism having a tubular casing and an output shaft which is extendable in a longitudinal direction of the tubular casing, the governing valve shaft may be directly driven by a second drive mechanism having a tubular casing and an output shaft that is extendable in a longitudinal direction of the tubular casing, and the casing of the first drive mechanism and the casing of the second drive mechanism may be arranged in parallel.

According to the above configuration, the mechanisms that drive the stop valve and the governing valve can be further made smaller by arranging the first drive mechanism driving the stop valve and the second drive mechanism driving the governing valve in parallel.

Additionally, when the stop valve shaft and the governing valve shaft are directly driven by the drive mechanisms, rattling, such as in a link mechanism, disappears, and controllability (valve opening degree, response) can be improved.

Additionally, the present invention provides a steam turbine equipped with any one of the above steam valves.

Since this steam turbine is equipped with the steam valve that can prevent the seizure from occurring between the stop valve and the governing valve, a more reliable steam turbine can be obtained.

Advantageous Effects of Invention

According to the invention, the seizure occurring between the stop valve and the governing valve can be prevented in the steam valve that drives the stop valve and the governing valve from the same direction on one axis.

DESCRIPTION OF EMBODIMENTS

First Embodiment

Figure 1:
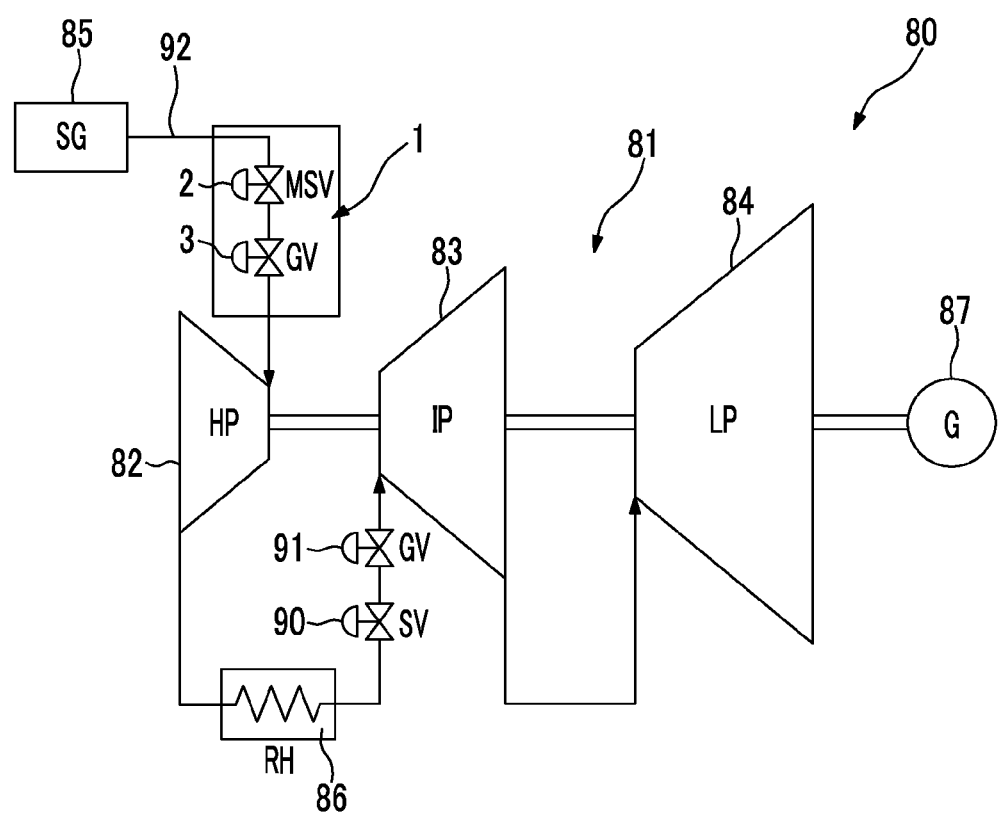
FIG. 1 is a schematic diagram of a power generation plant equipped with a steam turbine to which a steam valve according to a first embodiment of the invention is applied.

A first embodiment of the invention will be described below in detail referring to the drawings.

First, a power generation system 80 to which a steam valve 1 of the present embodiment is applied will be described. FIG. 1 is a schematic system diagram of the power generation system 80 including a steam turbine 81 equipped with the steam valve 1 according to the embodiment of the invention.

The power generation system 80 is constituted of the steam turbine 81 consisting of a high-pressure steam turbine 82, an intermediate-pressure steam turbine 83 and a low-pressure steam turbine 84, a boiler 85 that supplies high-pressure steam to the high-pressure steam turbine 82, a reheater 86 that reheats the steam discharged from the high-pressure steam turbine 82 and supplies the reheated steam to the intermediate-pressure steam turbine 83, and a generator 87 that is driven with the rotational driving power of the steam turbine 81.

Additionally, a main steam supply pipe 92 that connects a boiler 85 and the high-pressure steam turbine 82 together is provided with the steam valve 1 having the stop valve 2 (a main steam stop valve, MSV) and a governing valve 3 (steam governing valve, GV), so that supply of the steam to the high-pressure steam turbine 82 is stopped by full closure of the stop valve 2, or the supply flow volume of the steam is controlled by the governing valve 3.

A similar main steam stop valve 90 and a similar steam governing valve 91 are also provided in a pipe that connects the reheater 86 and the intermediate-pressure steam turbine 83 together.

The steam valve 1 of the present embodiment has the stop valve 2 capable of stopping/releasing the flow of steam S that flows through the main steam supply pipe 92 when driven so as to open/close, and the governing valve 3 that controls the flow volume of steam according to the load of the steam turbine 81 arranged on a wake side of the stop valve. The stop valve 2 and the governing valve 3 are constituted as one unit.

Next, the detailed structure of the steam valve 1 of the present embodiment will be described.

Figure 2:
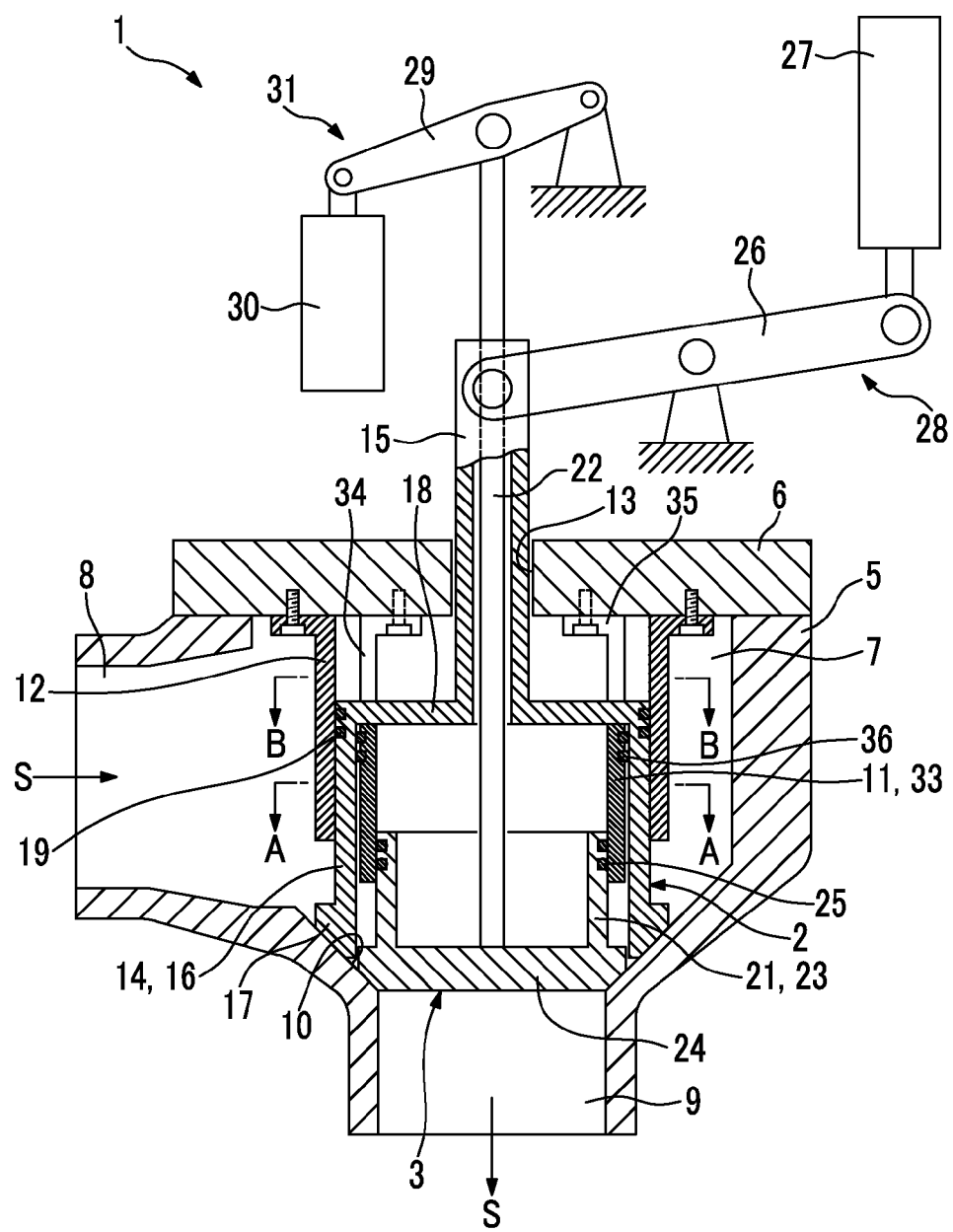
FIG. 2 is a longitudinal cross-sectional view of the steam valve according to the first embodiment of the invention, and a longitudinal cross-sectional view of the steam valve in which a stop valve and a governing valve are brought into a closed state.
Figure 3:
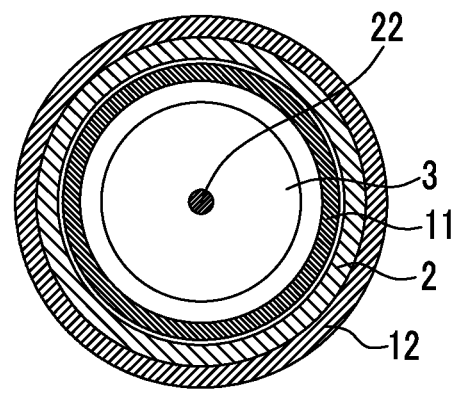
FIG. 3 is a cross-sectional view taken along line A-A of FIG. 2.

As illustrated in FIGS. 2 and 3, the steam valve 1 has a valve case 5 that forms an outer shell, the stop valve 2 that is housed in the interior of the valve case 5 so as to be movable up and down, the governing valve 3 that is similarly housed in the interior of the valve case 5 so as to be movable up and down, a first guide part 11 that guides the governing valve 3, and a second guide part 12 that guides the stop valve 2. The valve case 5 is sealed by an upper lid 6, and has a valve chamber 7 formed therein. That is, the stop valve 2 and the governing valve 3 are housed as an integral structure in one valve chamber 7. In addition, FIG. 2 is a view illustrating a state where the stop valve 2 and the governing valve 3 constituting the steam valve 1 are closed.

The valve case 5 has an inlet part 8 that communicates with the upstream side of the main steam supply pipe 92 (refer to FIG. 1), and an outlet part 9 that communicates with the downstream side of the main stream supply pipe. The stop valve 2 and the governing valve 3 are arranged so as to abut against a valve seat 10 that is an upper end of the outlet part 9. That is, the steam represented by symbol S flows in from the inlet part 8, and is supplied to, for example, the steam turbine 81 (refer to FIG. 1) on the downstream side via the outlet part 9.

In addition, in the following description, a radial direction of the stop valve 2 and the governing valve 3 that is formed in a cylindrical shape is simply referred to as a radial direction. Additionally, an opening/closing direction (sliding direction) of the valves is referred to as an up-down direction. This is because the axial direction of the stop valve 2 and the governing valve 3 that is formed in a cylindrical shape runs along a vertical direction. The opening/closing direction of the steam valve 1 is not limited to the up-down direction, and is appropriately selected according to the configuration of the steam valve 1.

The stop valve 2 has a main stop valve body 14 and a stop valve shaft 15 that drives the main stop valve body 14 so as to be movable up and down. The main stop valve body 14 is constituted of a stop valve cylindrical portion 16 that is formed in a bottomed cylindrical shape which is open downward and that is a cylindrical portion, a stop valve body 17 that forms a lower end of the main stop valve body 14 and abuts against the valve seat 10, and a stop valve upper surface part 18 that forms an upper surface of the main stop valve body 14.

The stop valve shaft 15 is provided so as to extend upward from the center of the stop valve upper surface part 18. Additionally, the stop valve shaft 15 has a hollow tube structure, and has a structure in which a governing valve shaft 22 to be described below passes through a hollow part. Additionally, a plurality of gutters are formed in the outer peripheral surface of the stop valve cylindrical portion 16 over its entire outer peripheral surface, and sealing members, such as O rings 19, are attached to the gutters. That is, the outer peripheral surface of the stop valve cylindrical portion 16 and the second guide part 12 are sealed by the O rings 19.

The governing valve 3 has a main governing valve body 21, and a governing valve shaft 22 that drives the main governing valve body 21 so as to be movable up and down.

The main governing valve body 21 is constituted of a governing valve cylindrical portion 23 that is formed in a bottomed cylindrical shape which is opened upward and that is a cylindrical portion, and a disk-like governing valve body 24 that forms a lower surface of the main governing valve body 21 and abuts against the valve seat 10.

A governing valve shaft 22 is provided so as to extend upward from the center of the governing valve body 24. As described above, the governing valve shaft 22 extends upward through the interior of the stop valve shaft 15. The stop valve shaft 15 and the governing valve shaft 22 extend from a through-hole 13 formed in the upper lid 6 of the valve case 5 to the outside of the valve case 5.

Namely, the governing valve 3 is coaxially provided in the interior of the stop valve 2, and is driven so as to open/close in the same direction as the opening/closing direction of the stop valve 2. Here, although "coaxial" means that the central axis of the stop valve 2 and the central axis of the governing valve 3 coincide with each other, these axes do not need to completely coincide with each other, but it is sufficient enough if the governing valve 3 is enabled to be opened/closed via the governing valve shaft 22 passing through the hollow part of the stop valve shaft 15.

Additionally, a plurality of gutters are formed in the outer peripheral surface of the governing valve cylindrical portion 23 over its entire outer peripheral surface, and sealing members, such as O rings 25, are attached to the gutters. That is, the outer peripheral surface of the governing valve cylindrical portion 23 and the first guide part 11 are sealed by the O ring 25.

As for the stop valve shaft 15 that is a hollow tube, a tip portion protruding to the outside of the valve chamber 7 is driven by a stop valve drive mechanism 28 using a hydraulic cylinder mechanism 27 or the like via a link mechanism 26.

The governing valve shaft 22 inserted into the interior of the stop valve shaft 15 similarly protrudes to the outside of the valve chamber 7, and is directly driven externally or driven by a governing valve drive mechanism 31 using a hydraulic cylinder mechanism 30 or the like via a link mechanism 29.

The first guide part 11 has a cylindrical main body section 33, and a stay part 34 that connects the main body section 33 and a lower surface of the upper lid 6 together. The first guide part 11 is fixed to the upper lid 6 by a flange portion 35 that overhangs from an upper end of the stay part 34 to an inner peripheral side thereof. Specifically, the first guide part 11 is fixed to the upper lid 6 using fastening members, such as bolts.

The first guide part 11 is provided between the stop valve 2 and the governing valve 3 so as to separate these valves in the radial direction. That is, the stop valve 2 and the governing valve 3 of the present embodiment are not configured such that these valves slide on each other, and are arranged with a predetermined gap, and the first guide part 11 is provided in this gap.

An inner peripheral side of the first guide part 11 is a guide that holds the governing valve 3 so as to be slidable in the up-down direction. A plurality of gutters are formed in the outer peripheral surface of the main body section 33 of the first guide part 11, and sealing members, such as O rings 36, are attached to the gutters. The outer peripheral surface of the first guide part 11 and an inner peripheral surface of the stop valve cylindrical portion 16 of the governing valve 3 are sealed by the O rings 36. In addition, in the steam valve 1 of the present embodiment, the first guide part 11 guides the governing valve 3, and does not necessarily guide the stop valve 2. Hence, a predetermined gap is provided between the outer peripheral surface of the first guide part 11 and the inner peripheral surface of the stop valve 2.

Figure 4:
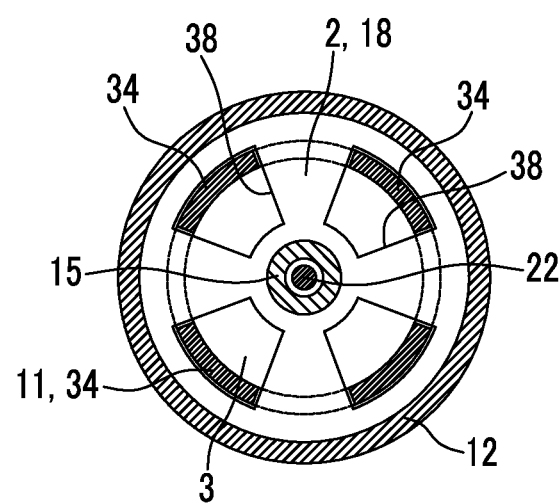
FIG. 4 is a cross-sectional view taken along line B-B of FIG. 2.

As illustrated in FIG. 4, the stay part 34 of the first guide part 11 extends above the stop valve 2 via a plurality of holes 38 formed in the stop valve upper surface part 18 of the stop valve 2. That is, the first guide part 11 passes through the stop valve upper surface part 18 of the stop valve 2 and is fixed to the upper lid 6.

The second guide part 12 is a guide that is provided on an outer peripheral side of the stop valve 2 and holds the stop valve 2 so as to be slidable in the up-down direction.

The second guide part 12 is fixed to the upper lid 6 by a flange portion 39 that overhangs from an upper end of the second guide part to an outer peripheral side thereof. Specifically, the second guide part 12 is fixed to the upper lid 6 using fastening members, such as bolts.

Next, the operation of the steam valve 1 of the present embodiment will be described.

Figure 5:
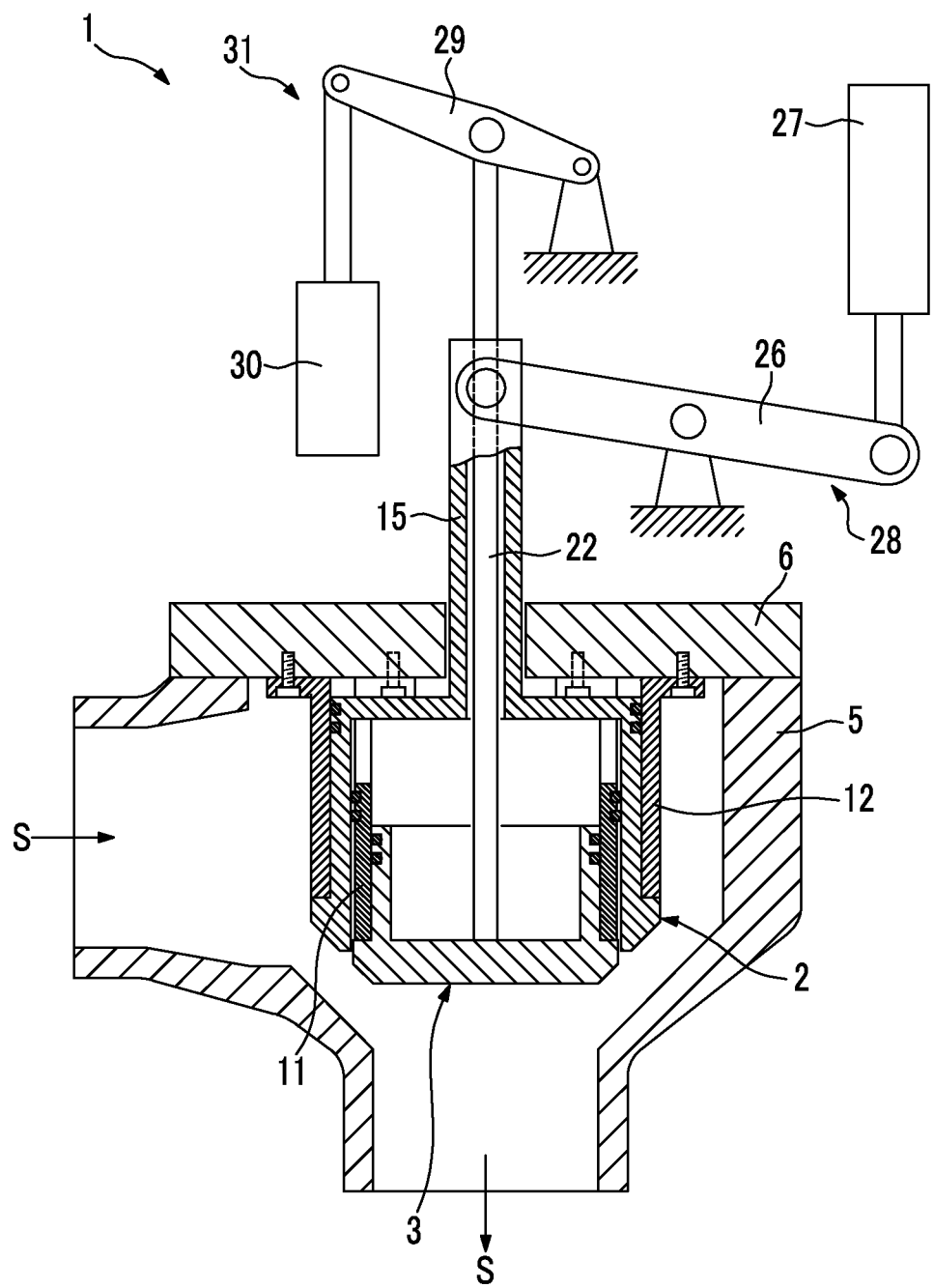
FIG. 5 is a longitudinal cross-sectional view of the steam valve according to the first embodiment of the invention, and a longitudinal cross-sectional view of the steam valve in which the stop valve and the governing valve are brought into an open state.

When steam is made to flow to the steam turbine 81 side, as illustrated in FIG. 5, the stop valve 2 is first opened via the link mechanism 26, and the stop valve shaft 15 of the hollow tube by the stop valve drive mechanism 28 using the hydraulic cylinder mechanism 27 or the like. Next, the governing valve 3 is opened via the link mechanism 29 and the governing valve shaft 22, which passes through the stop valve shaft 15 which is the hollow tube, by the governing valve drive mechanism 31 using the hydraulic cylinder mechanism 30 or the like. If the governing valve 3 is opened, steam of a flow volume according to the opening degree of the governing valve flows into the steam turbine 81 side, and the steam turbine 81 is driven according to the flow volume.

In this way, the inflow rate of steam to the steam turbine 81 side is controlled by adjusting the opening degree of the governing valve 3 so as to correspond to the load of the steam turbine 81.

According to the above embodiment, since the first guide part 11 is provided so as to separate the stop valve 2 and the governing valve 3 and sliding parts of the stop valve 2 and the governing valve 3 do not come into contact with each other, the seizure between the stop valve 2 and the governing valve 3 can be prevented.

Additionally, since a configuration in which the stop valve 2 is guided by the second guide part 12 and the first guide part 11 guides only the governing valve 3 is provided, guiding of the stop valve 2 can be more reliably performed. That is, since a structure in which the guide parts are respectively provided in the stop valve 2 and the governing valve 3 is provided, positioning of the stop valve 2 and the governing valve 3 becomes easy.

Additionally, only the through-hole 13 through which one valve shaft is passed is required as an insertion hole for the valve shafts by providing a structure in which the stop valve 2 and the governing valve 3 are integrally housed in the valve chamber 7 and the governing valve shaft 22 passes through the stop valve shaft 15 that is the hollow tube. Accordingly, miniaturization of the steam valve 1 can be achieved.

Second Embodiment

Hereinafter, a steam valve of a second embodiment of the invention will be described with reference to the drawings. In addition, main differences from the above-described first embodiment will be described in the present embodiment, and the description of the same portions will be omitted.

Figure 6:
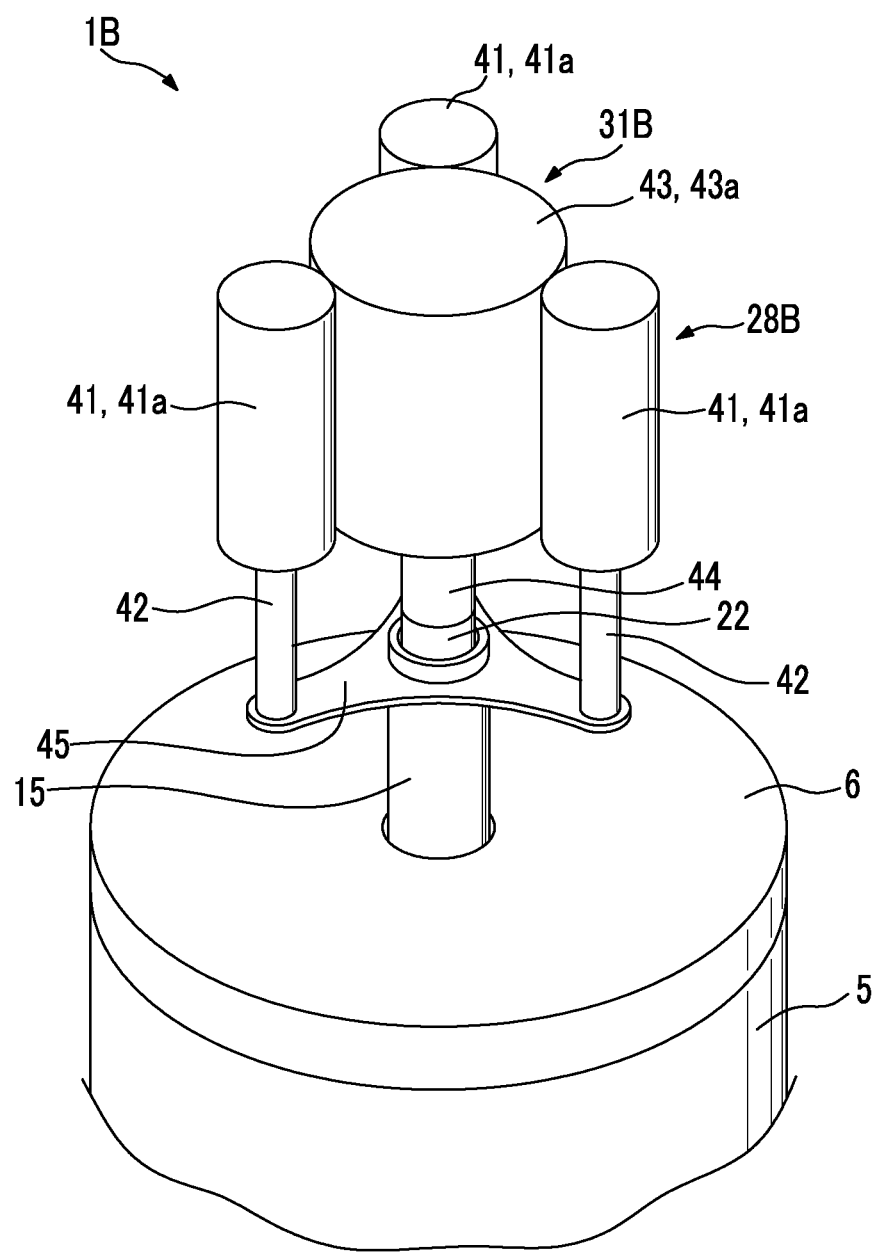
FIG. 6 is a perspective view illustrating a stop valve drive mechanism and a governing valve drive mechanism of a steam valve according to a second embodiment of the invention.

As illustrated in FIG. 6, a stop valve drive mechanism 28B of a steam valve 1B of the present embodiment has a plurality of (three in the present embodiment) outer hydraulic cylinder mechanisms 41 (first drive mechanisms), and a connecting member 45. The outer hydraulic cylinder mechanisms 41 are fixed to predetermined positions via a predetermined bracket.

Each outer hydraulic cylinder mechanism 41 has a tubular casing 41a, and an output shaft 42 that is extendable in a longitudinal direction of the tubular casing 41a. The output shafts 42 of the plurality of the outer hydraulic cylinder mechanisms 41 and the stop valve shaft 15 are connected together via the connecting member 45. The plurality of outer hydraulic cylinder mechanisms 41 are arranged so that the output shafts 42 of the outer hydraulic cylinder mechanisms 41 become parallel to the stop valve shaft 15.

A governing valve drive mechanism 31B of the present embodiment has one inner hydraulic cylinder mechanism 43 (second drive mechanism). The inner hydraulic cylinder mechanism 43 is fixed to a predetermined position via the predetermined bracket.

The inner hydraulic cylinder mechanism 43 has a tubular casing 43a, and an output shaft 44 that is extendable in a longitudinal direction of the tubular casing 43a. The output shaft 44 of the inner hydraulic cylinder mechanism 43 is directly connected to the governing valve shaft 22 in a straight line. The output shaft 44 and the governing valve shaft 22 can be joined together, for example, by welding. Accordingly, the inner hydraulic cylinder mechanism 43 is arranged so that the central axis of the inner hydraulic cylinder mechanism 43 runs along the central axis of the governing valve shaft 22.

The connecting member 45 connects the output shafts 41a of the respective outer hydraulic cylinder mechanisms 41 together, and is connected to the stop valve shaft 15 at the center thereof. That is, the stop valve shaft 15 is directly driven by the plurality of outer hydraulic cylinder mechanisms 41 via the connecting member 45. The plurality of outer hydraulic cylinder mechanisms 41 are controlled so as to be synchronously driven by a control device (not illustrated).

The casings 41a of the plurality of outer hydraulic cylinder mechanisms 41 are arranged in parallel around the casing 43a of the inner hydraulic cylinder mechanism 43. Specifically, the casings 41a of the plurality of outer hydraulic cylinder mechanisms 41 are arranged so that the central axes of the casings 41a run along the central axis of the casing 43a of the inner hydraulic cylinder mechanism 43. Additionally, the casings 41a of the outer hydraulic cylinder mechanisms 41 are arranged at regular intervals around the casing 43a of the inner hydraulic cylinder mechanism 43. Moreover, the casing 41a of the outer hydraulic cylinder mechanism 41 is preferably arranged at a position as close to the casing 43a of the inner hydraulic cylinder mechanism 43 as possible.

According to the above embodiment, the stop valve drive mechanism 28B and the governing valve drive mechanism 31B can be further made smaller by arranging the outer hydraulic cylinder mechanisms 41 driving the stop valve 2 and the inner hydraulic cylinder mechanism 43 driving the governing valve 3 in parallel.

Additionally, when the stop valve shaft 15 and the governing valve shaft 22 are directly driven by the outer hydraulic cylinder mechanisms 41 and the inner hydraulic cylinder mechanism 43, rattling, such as in a link mechanism, disappears, and controllability (valve opening degree, response) can be improved.

Modification Example of Second Embodiment

Next, the steam valve according to a modification example of the second embodiment will be described.

Figure 7:
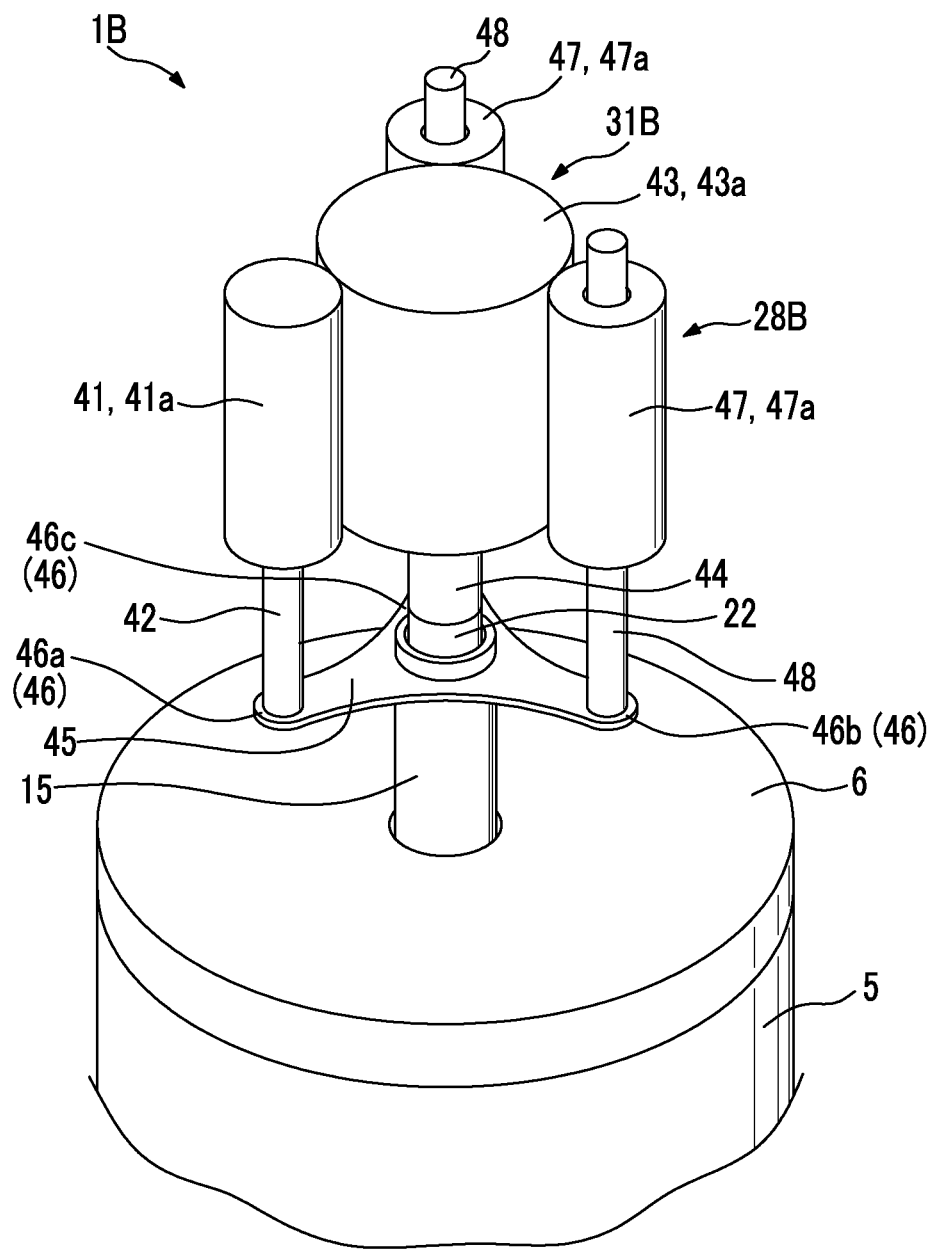
FIG. 7 is a perspective view illustrating the stop valve drive mechanism and the governing valve drive mechanism of the steam valve according to a modification example of the second embodiment of the invention.

As illustrated in FIG. 7, the stop valve shaft 15 of the steam valve 1B of the modification example of the second embodiment is driven according to one outer hydraulic cylinder mechanism 41. The output shaft 42 of the outer hydraulic cylinder mechanism 41 is connected to the vertex of one protruding piece 46a among three protruding pieces 46 of the triangular connecting member 45.

Guide mechanisms 47 are connected to the two remaining protruding pieces 46b and 46c of the triangular connecting member 45. Each guide mechanism 47 has a tubular guide part 47a, and a rod 48 that is arranged so as to be insertable through the interior of the guide part 47a. The guide part 47a of the guide mechanisms 47 are arranged in parallel around the casing 43a of the inner hydraulic cylinder mechanism 43, similar to the casings 41a of the outer hydraulic cylinder mechanisms 41.

The rods 48 are connected to the connecting member 45.

According to the above modification example, since only one outer hydraulic cylinder mechanism 41 that drives the stop valve 2 is required, it is unnecessary to synchronize the plurality of cylinder mechanisms. As a result, the stop valve drive mechanism 28B can be further simplified. Additionally, by providing the guide mechanism 47, the stop valve shaft 15 driven by the outer hydraulic cylinder mechanism 41 can be prevented from being tilted.

In addition, the technical scope of the invention is not limited to the above embodiments, and various changes can be made without departing from the scope of the invention.

For example, in the above-described embodiments, the first guide part 11 guides only the governing valve 3. However, a configuration may be adopted in which the first guide part 11 guides the governing valve 3 and the stop valve 2 and the second guide part 12 is not installed.

Additionally, in the above embodiments, the first guide part 11 and the second guide part 12 are fixed to the upper lid 6 via fastening members, such as bolts. However, the invention is not limited to this. At least one of the first guide part 11 and the second guide part 12 may be formed integrally with the upper lid 6. Moreover, the upper lid 6 may be formed integrally with the valve case 5.

Additionally, in the above embodiments, a configuration is adopted in which the stop valve shaft 15 is a hollow tube and the governing valve shaft 22 is passed through the interior of the stop valve shaft 15. However, a configuration may be adopted in which the governing valve shaft 22 is a hollow tube and the stop valve shaft 15 passes through the interior of the governing valve shaft 22.

Moreover, in the above embodiments, the hydraulic cylinders are used as driving sources of the stop valve drive mechanisms 28 and 28B and the governing valve drive mechanisms 31 and 31B. However, the invention is not limited to this. For example, pneumatic cylinders, electric cylinders, or the like may be adopted. Additionally, a configuration may be adopted in which gears that convert a rotational motion into a linear motion with respect to the rotation of a rotary motor are combined.

INDUSTRIAL APPLICABILITY

According to this steam valve, since the first guide part is provided so as to separate the stop valve and the governing valve and thereby the stop valve and the governing valve do not come into contact with each other, the seizure occurring between the stop valve and the governing valve can be prevented.

REFERENCE SIGNS LIST

1: STEAM VALVE
2: STOP VALVE

3: GOVERNING VALVE
5: VALVE CASE
6: UPPER LID
7: VALVE CHAMBER
11: FIRST GUIDE PART
12: SECOND GUIDE PART
13: THROUGH-HOLE
15: STOP VALVE SHAFT
22: GOVERNING VALVE SHAFT
28: STOP VALVE DRIVE MECHANISM
31: GOVERNING VALVE DRIVE MECHANISM
41: OUTER HYDRAULIC CYLINDER MECHANISM (FIRST DRIVE MECHANISM)
41a: CASING
42: OUTPUT SHAFT
43: INNER HYDRAULIC CYLINDER MECHANISM (SECOND DRIVE MECHANISM)
43a: CASING
44: OUTPUT SHAFT
45: CONNECTING MEMBER
47: GUIDE MECHANISM
81: STEAM TURBINE

The invention claimed is:

1. A steam valve comprising:
an upper lid;
a valve case that is sealed with the upper lid, and that has a valve chamber formed therein;
a stop valve capable of stopping/releasing the flow of steam when driven so as to open/close;
a governing valve that is provided coaxially in the interior of the stop valve, and that controls the flow volume of the steam when driven to open/close in the same direction as an opening/closing direction of the stop valve;
a first guide part that passes through an upper surface part of the stop valve, that is fixed to the upper lid, that is provided between the stop valve and the governing valve so as to separate the stop valve and the governing valve in a radial direction, and that guides at least the governing valve in the opening/closing direction; and
a second guide part that is provided on an outer peripheral side of the stop valve and that guides the stop valve in the opening/closing direction,
wherein the stop valve and the governing valve are housed as an integral structure in the valve chamber of the valve case.

2. The steam valve according to claim 1, further comprising:
a valve body of the stop valve;
a valve body of the governing valve;
a stop valve shaft that actuates the stop valve; and
a governing valve shaft that actuates the governing valve,
wherein the valve case includes a valve seat, against which the valve body of the stop valve and the valve body of the governing valve abut, and
wherein at least one of the stop valve shaft and the governing valve shaft has a hollow structure, the other of the stop valve shaft and the governing valve shaft is inserted into the hollow structure, and the stop valve shaft and the governing valve shaft protrude toward the outside via a through-hole formed in the valve case.

3. The steam valve according to claim 2,
wherein the stop valve shaft is directly driven by a first drive mechanism having a tubular casing and an output shaft which is extendable in a longitudinal direction of the tubular casing,
the governing valve shaft is directly driven by a second drive mechanism having a tubular casing and an output shaft that is extendable in a longitudinal direction of the tubular casing, and
the casing of the first drive mechanism and the casing of the second drive mechanism are arranged in parallel.

4. A steam turbine comprising:
the steam valve according to claim 1.

5. A steam turbine comprising:
the steam valve according to claim 2.

6. A steam turbine comprising:
the steam valve according to claim 3.

* * * * *